United States Patent
Feng et al.

(10) Patent No.: US 9,826,007 B2
(45) Date of Patent: *Nov. 21, 2017

(54) METHOD AND APPARATUS FOR SHARING VIEWING INFORMATION

(71) Applicant: Hulu, LLC, Santa Monica, CA (US)

(72) Inventors: Eric I. Feng, Menlo Park, CA (US); Hua Zheng, Beijing (CN); Xin Jin, Beijing (CN); Zhibing Wang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 714 days.

This patent is subject to a terminal disclaimer.

(21) Appl. No.: 14/083,104

(22) Filed: Nov. 18, 2013

(65) Prior Publication Data

US 2014/0075343 A1 Mar. 13, 2014

Related U.S. Application Data

(63) Continuation of application No. 12/876,964, filed on Sep. 7, 2010, now Pat. No. 8,589,795.

(51) Int. Cl.

| | |
|---|---|
| *G06F 3/0481* | (2013.01) |
| *H04L 29/06* | (2006.01) |
| *G06F 3/0487* | (2013.01) |
| *H04L 12/18* | (2006.01) |
| *G06F 3/0484* | (2013.01) |
| *H04N 21/475* | (2011.01) |
| *H04N 21/4788* | (2011.01) |
| *H04N 21/81* | (2011.01) |

(52) U.S. Cl.
CPC .......... *H04L 65/403* (2013.01); *G06F 3/0481* (2013.01); *G06F 3/0484* (2013.01); *G06F 3/0487* (2013.01); *H04L 12/1813* (2013.01); *H04N 21/4755* (2013.01); *H04N 21/4788* (2013.01); *H04N 21/812* (2013.01); *H04N 21/8133* (2013.01)

(58) Field of Classification Search
CPC ........ G06F 3/16; G06F 3/167; G06F 3/04892; G06F 3/0481; G06F 3/0484; G06F 3/0487; H04L 12/1813; H04N 21/812

See application file for complete search history.

(56) References Cited

U.S. PATENT DOCUMENTS

| | | | |
|---|---|---|---|
| 6,574,793 B1 * | 6/2003 | Ngo | ......................... H04N 7/16 348/E7.054 |
| 7,634,790 B2 | 12/2009 | Finseth | |
| 7,996,566 B1 | 8/2011 | Sylvain et al. | |

(Continued)

OTHER PUBLICATIONS

International Search Report and Written Opinion dated Jan. 20, 2012 from International Application No. PCT/US2011/050555, 7 pages.

*Primary Examiner* — Steven Sax
(74) *Attorney, Agent, or Firm* — Fountainhead Law Group P.C.

(57) ABSTRACT

A method and apparatus for sharing viewing information is disclosed. In one embodiment, the method comprises receiving an designation of a second user from the first user; and transmitting the first user viewing information to the designated second user. The shared viewing information may comprise the identity of a currently viewed media program, a list of scheduled media program viewings, or the media program itself.

20 Claims, 7 Drawing Sheets

(56) References Cited

U.S. PATENT DOCUMENTS

| | | | |
|---|---|---|---|
| 8,543,907 B1* | 9/2013 | Roskind | G06F 8/443 |
| | | | 715/234 |
| 8,589,795 B2 | 11/2013 | Feng et al. | |
| 2002/0152461 A1* | 10/2002 | Istvan | H04L 12/2803 |
| | | | 725/32 |
| 2004/0044723 A1 | 3/2004 | Bell et al. | |
| 2006/0047957 A1 | 3/2006 | Helms et al. | |
| 2006/0109854 A1 | 5/2006 | Cancel | |
| 2007/0105589 A1* | 5/2007 | Lu | H04W 88/02 |
| | | | 455/556.2 |
| 2007/0250863 A1 | 10/2007 | Ferguson | |
| 2008/0222295 A1* | 9/2008 | Robinson | G06F 17/30867 |
| | | | 709/227 |
| 2008/0259906 A1* | 10/2008 | Shkedi | G06Q 30/0241 |
| | | | 370/352 |
| 2008/0276279 A1 | 11/2008 | Gossweiler | |
| 2008/0290957 A1 | 11/2008 | Li | |
| 2009/0076897 A1* | 3/2009 | Ennals | G06F 17/30867 |
| | | | 705/14.26 |
| 2010/0082784 A1 | 4/2010 | Rosenblatt et al. | |
| 2010/0138746 A1 | 6/2010 | Zarom | |
| 2010/0188477 A1 | 7/2010 | Derocher et al. | |
| 2010/0306249 A1* | 12/2010 | Hill | G06F 17/30867 |
| | | | 707/769 |
| 2011/0063090 A1* | 3/2011 | DeWitt | G08C 17/02 |
| | | | 340/10.42 |
| 2011/0082897 A1* | 4/2011 | Ball | H04L 67/22 |
| | | | 709/202 |
| 2011/0283322 A1* | 11/2011 | Hamano | H04N 5/44543 |
| | | | 725/44 |
| 2011/0289227 A1* | 11/2011 | Hsu | H04L 29/12528 |
| | | | 709/228 |
| 2011/0320380 A1 | 12/2011 | Zahn et al. | |
| 2012/0106399 A1* | 5/2012 | Abendroth | H04L 29/12367 |
| | | | 370/255 |
| 2012/0192221 A1 | 7/2012 | McDonough et al. | |
| 2012/0210369 A1 | 8/2012 | Sakhartov et al. | |

\* cited by examiner

METHOD AND APPARATUS FOR SHARING VIEWING INFORMATION

CROSS-REFERENCES TO RELATED APPLICATIONS

This application is a continuation of U.S. patent application Ser. No. 12/876,964 filed Sep. 7, 2010 entitled "Method and Apparatus for Sharing Viewing Information", issued on Nov. 19, 2013 as U.S. Pat. No. 8,589,795, which is incorporated by reference in its entirety for all purposes.

BACKGROUND OF THE INVENTION

1. Field of the Invention

The present invention relates to systems and methods for viewing media programs, and in particular to a system and method for sharing media program viewing information with third parties.

2. Description of the Related Art

The dissemination and playback of media programs has undergone substantial changes in the past decade. Previously, media programs (which may include audio, video, or both) were disseminated either by analog broadcast (conventional, satellite, or cable) or by physical dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance and more easily).

Second, largely due to improved signal processing and more and widespread high-speed Internet access availability (e.g. DSL, fiber, and/or satellite), digital technology also permitted the dissemination and playback of media programs via the Internet. Dissemination of media programs via the Internet may occur either by simple downloading, progressive downloading or streaming.

With progressive downloading, a media file having the media program is downloaded via the Internet using dial-up, DSL, ADSL, cable, T1, or other high-speed connection, typically by a web server via the Internet.

Unlike simple downloading, in which bytes of the media file may be downloaded in any convenient order, progressive downloading downloads bytes from the beginning of a file and continues downloading the file sequentially and consecutively until the last byte. In some progressive downloading implementations, the entire file must be downloaded first before a media player can start playback. However, progressive downloading may permit media players to start playback once enough of the beginning of the file has been downloaded. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user would have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, (1) streaming media servers provide users random access to the video file, (2) streaming media servers allow monitoring of who is viewing what video programs and how long they are watched (3) streaming media servers use transmission bandwidth more efficiently, since only the amount of data required to support the viewing experience is transmitted, and (4) the video file transmitted by streaming media servers is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

One of the limitations of the reception of traditionally broadcast media programs is that subscribers who are not co-located cannot easily share the viewing experience. While they may be able to watch the media program at the same time in a broadcast model, it is not easy for the subscribers to converse with one another during the broadcast to discuss the broadcast or other matters. This is even more the case when the media programs are delivered via the Internet, as such media programs are typically delivered to individual users when requested and are therefore unsynchronized. In such cases, even if a communication media were available, the participants would not necessarily be watching the same portion of the media program. Further, transmitting the same media program independently to a number of different subscribers can waste bandwidth and reduce service quality for all subscribers. Accordingly, there is a need for a system and method for sharing viewing information among subscribers. The present invention satisfies this need.

SUMMARY OF THE INVENTION

To address the requirements described above, the present invention discloses a method and apparatus for sharing viewing information of a first user with a second user. In one embodiment, the method comprises the steps of receiving an designation of a second user from the first user; and transmitting the first user viewing information to the designated second user. The invention may also be embodied in an apparatus comprising a media program provider that includes a means for performing the foregoing steps such as a first module for accepting an designation of a second user from the first user; and a second module for transmitting the first user viewing information to the designated second user.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
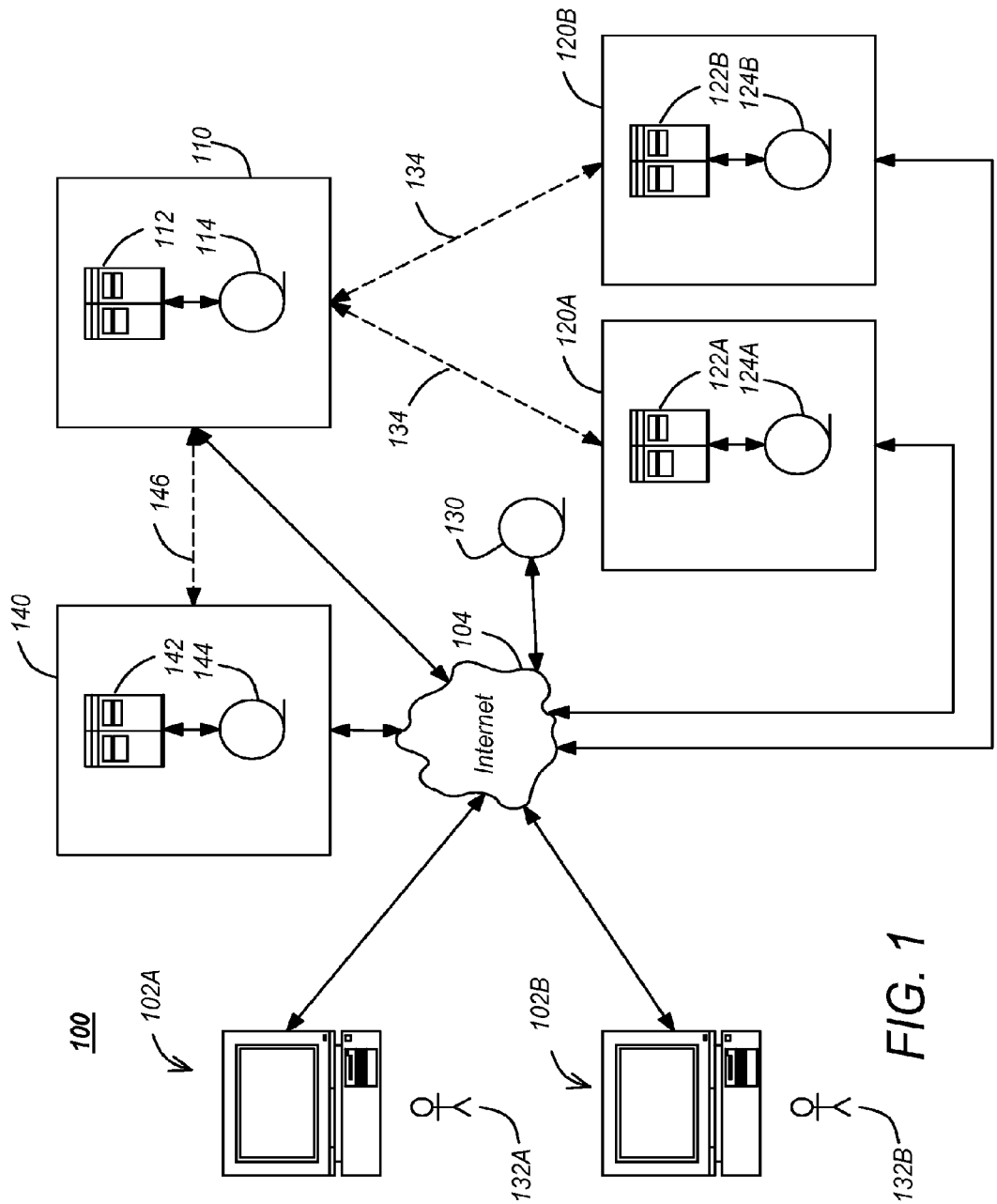
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 may stream media programs to one or more user computers including a first user computer 102A associated with first user 132A and a second user computer 102B associated with second user 132 B. Hereinafter, first user computer 102A and second user computer 102B may be alternatively referred to as user computer(s) 102 and first user 132A and second user 132B may be alternatively referred to as user(s) 132. The media programs may be streamed directly from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user computer 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user computer 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user computer 102 at the appropriate time.

In one embodiment, the advertisements are integrated with the streamed or downloaded video from the media program provider 110. In another embodiment, the advertisements are not integrated with the media program, but are instead transmitted to the user computer 102 separately from the media program, and replayed at the appropriate time using indices that indicate when each advertisement should be presented. For example, advertisements can be indexed and streamed or downloaded to the user computer 102 (from the media program provider 110 or the advertisement provider 140), and such advertisements can be played back to the user 132 at times indicated by corresponding indices in the media program.

Figure 2:
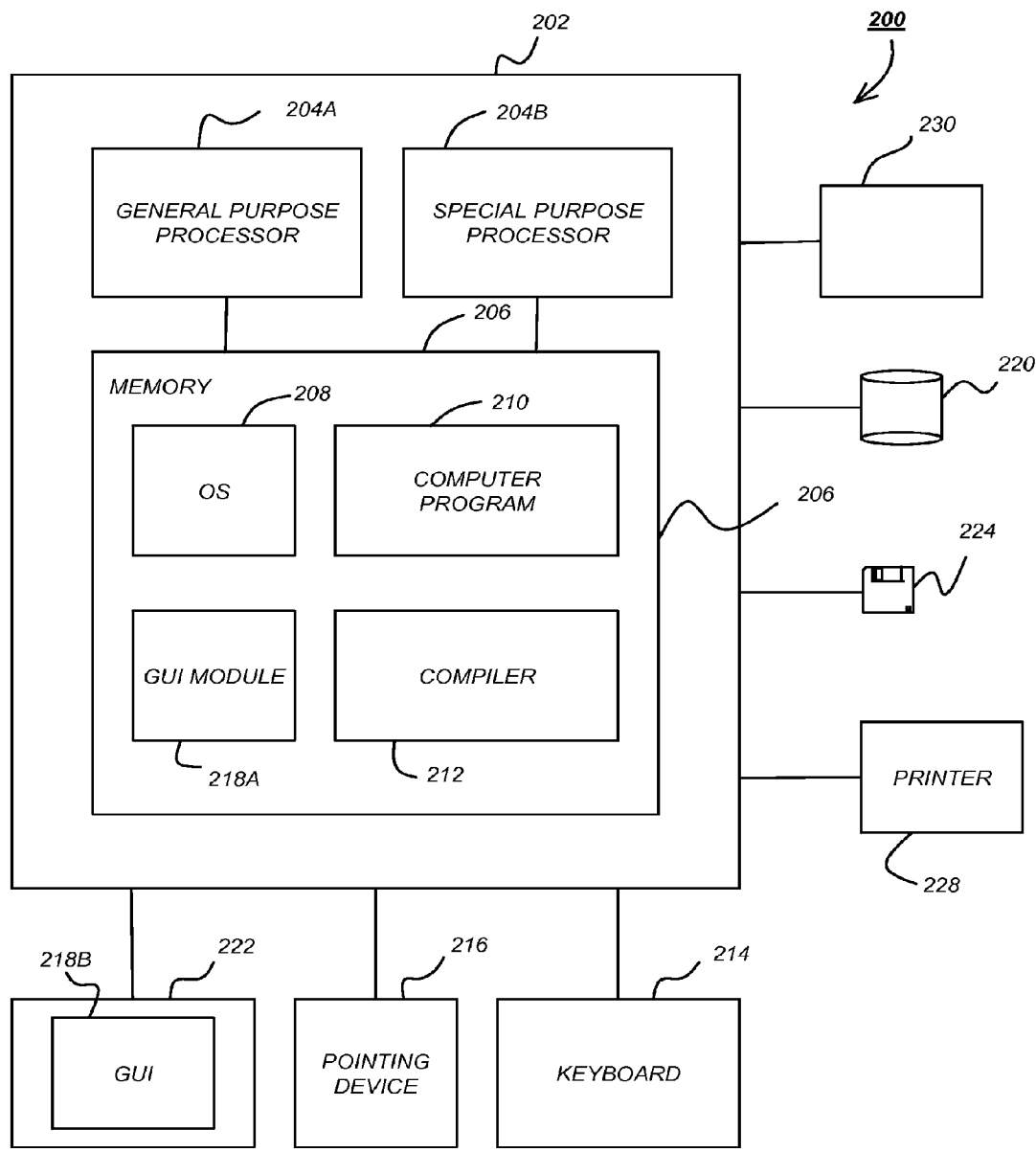
FIG. 2 illustrates an exemplary computer system that could be used to implement elements of the present invention.

FIG. 2 illustrates an exemplary computer system 202 that could be used to implement elements of the present invention, including the user computer 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as IPODs, IPHONEs, IPADs, cellphones, portable MP3 players, video game consoles, notebook computers, pocket computers, personal data assistants (PDAs) or any other device with suitable processing, communication, and input/output capability.

Figure 3:
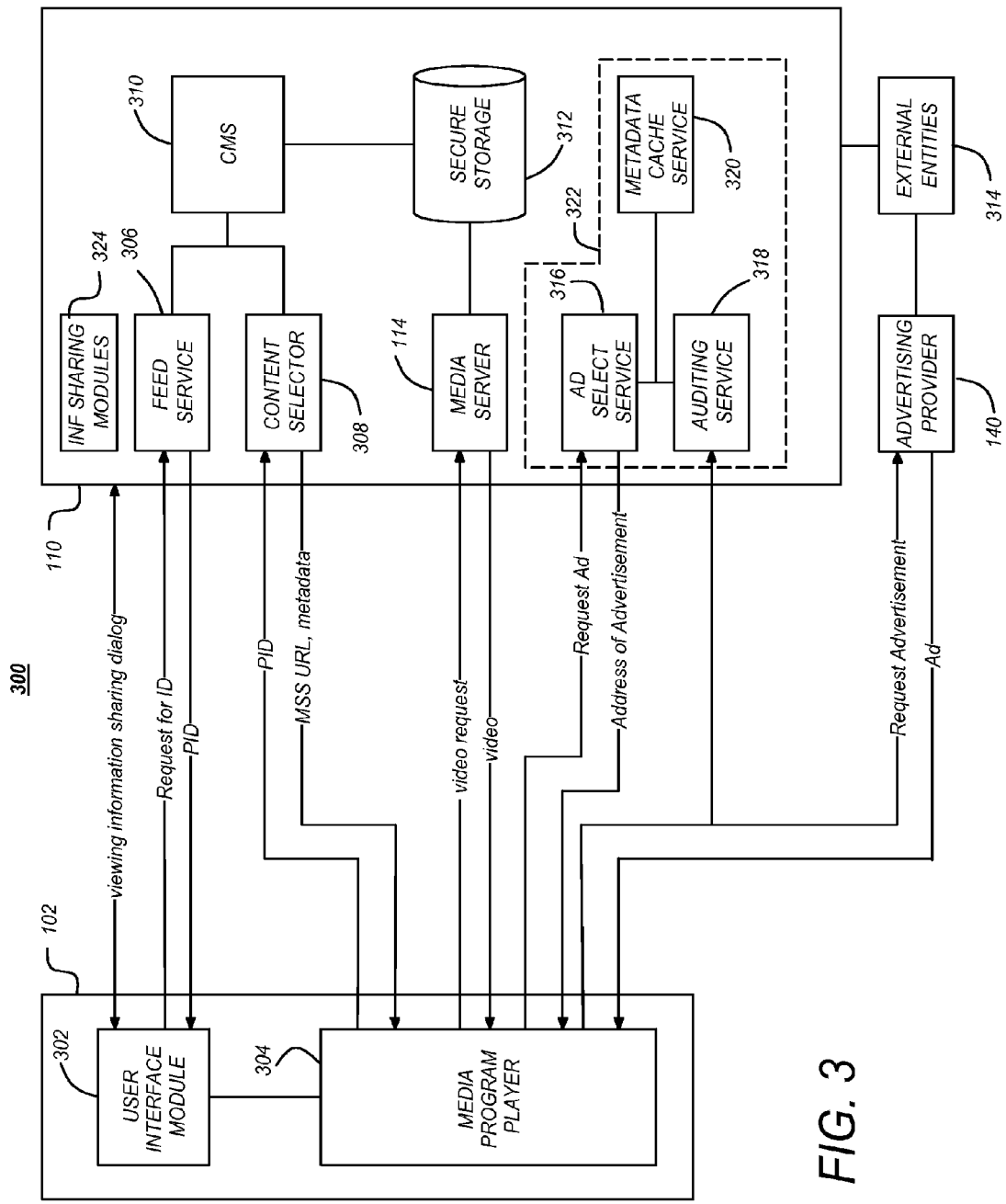
FIG. 3 is a diagram further illustrating a content delivery subsystem that can be used for the provision of media programs in response to a media program request.

FIG. 3 is a diagram further illustrating a content delivery subsystem (CDS) 300 that can be used for the provision of media programs in response to a media program request. Although discussed with reference to the user 132 and the client computer 102, these same operations can be used to present media programs to the host 140 and host server 142 as well, with such media programs later embedded in webpages by the host 140 so that they can be accessed by the client computer 102.

In the illustrated embodiment, the content delivery subsystem 300 includes the user computer 102, the media program provider 110, and an advertisement provider 140. Although the advertisement provider 140 is illustrated as a separate architectural entity than the media program provider 110, the advertisement provider 140 may be integrated within the media program provider 110. The CDS 300 provides a means to provide media programs and advertisements across a plurality of distribution networks, which may include, for example, www.hulu.com, www.imdb.com, www.aol.com or www.msn.com. Metadata related to media program and advertisement content is stored in the content delivery system 300, as is data describing where the media programs and advertisements may be found within the CDS 300.

The user computer 102 may include an interface module 302 and a media program player 304. The interface module 302 includes instructions performed by the user computer 102 that are used to present information to the user 132 and to accept user input, including commands. The interface module 302 may also be integrated with the media program player 304. The presented information may include a program guide, advertisement options, and the user input may include selected advertisement options and media program playback selections.

Using the user computer 102 and the interface module 302, the user 132 enters a choice for a media program. The user interface module 302 transmits a request message to a feed service 306 implemented by the media program provider 110 for a program identifier (PID). The PID is used to identify content such as a specific media program running on a specific distribution network. For example, season 2 of "The Office" running on www.hulu.com will have a different PID than the same exact show running on www.msn.com.

The feed service 306 then returns the PID to the user interface module 302. The PID and associated commands (e.g. the play command) are provided to the media program player 304. The media program player 304 may be embedded in a webpage from a third party, or may be part of a webpage maintained by the media program provider 110, or may be implemented in a stand alone application.

The media program player 304 transmits the PID to a content selector 308 implemented by the media program provider 110. The content selector 308 identifies the actual path (uniform resource locator or URL, for example) to the requested media program associated with the transmitted PID, as well as programming metadata that is used by the media program player 304 to help identify restrictions (for example, preventing access to adult-themed content if the user 132 is known to be under 18), advertising targeting rules as well as advertising breaks. The advertising breaks indicate where advertisements may be inserted, and can be specified in terms of the time since the beginning of the media program, the time remaining, or any other suitable measure. The URL and the metadata are then transmitted to the media program player 304. The media program player 304 provides a video request to the media server 114 at the URL received from the content selector 308. The video request includes the PID and may include other information as well. The video request may be for streaming or progressively downloading the requested media program.

The media streaming server (MSS) 114 responds to the video request by providing the media program to the user computer 102. In one embodiment, the MSS 114 is a service provider that has a wide range of geographically distributed computers that store replicated copies of media programs and website content. The MSS 114 can be a third party provider (e.g. only contractually associated with the media program provider 110), or can be part of the media program provider 110. Geographically diverse servers assure that when the user 132 requests playback of a media program, the media program is streamed from a geographically local server, to increase media program playback performance. Multiple servers also offer redundancy.

The MSS 114 obtains the media program from secure storage 312 which may be disposed in the media program provider 110 facility, or which may be disposed at a third party facility. The content management service 310 interfaces with the feed service 306, the content selector 308, and secure storage 312 to manage which media programs are provided to the media server 114. External entities 314 can include third parties such entities that provide the advertisements that are to be displayed to the user (which includes sponsors and/or their advertising agencies), third party providers of media programs, and entities from which the user 132 may purchase goods or services.

The media program is transmitted (via streaming or progressive downloading, for example) to the media program player 304. At or before the times identified in the advertising breaks defined above, the media program player 304 transmits an advertisement list request to the advertisement server (ad server) 322. The ad server 322 includes an intercoupled advertisement select service 316, metadata cache service 320, and auditing service 318. In one embodiment, the advertisement request includes information describing the media program currently being viewed by the user as well as information about the user. This information can be used to select advertisements to be shown along with the media program. The metadata cache service 320 performs off-line computations to determine the logical requirements of the advertisement rules (which describe the media program and user characteristics consistent with the advertisement). When an advertising request is received, the ad select service 316 retrieves the precomputed information and compares the precomputed logical characteristics of the advertising rules with the advertisement request. Advertisements requests that have characteristics meeting the advertisement rules are then identified. The address of the selected advertisement(s) are then transmitted to the media program player 304. At or before the advertisement break, the media program player 304 sends a request for the advertisement to the URL of the advertising provider 340, which transmits the advertisement to the media program player 304 for playback.

Figure 4:
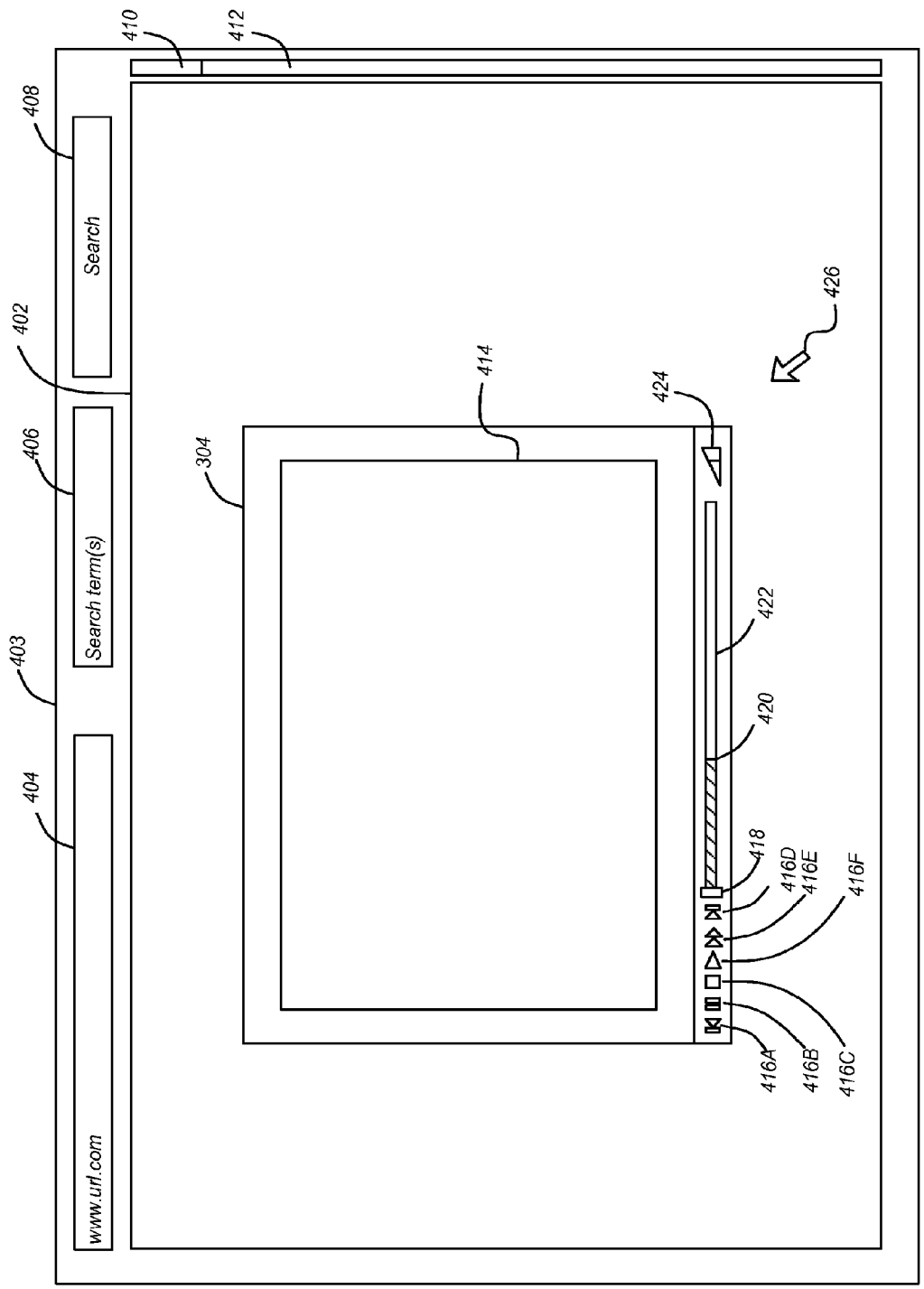
FIG. 4 is a diagram illustrating an exemplary user interface presenting one embodiment of the media program player implemented by the user computer and presented on the display.

FIG. 4 is a diagram illustrating an exemplary user interface 402 presenting one embodiment of the media program player (MPP) 304 implemented by the user computer 102 and presented on the display 222. In the illustrated embodiment, the MPP 252 is presented in a browser 403. The browser 403 may have an address box 404 where the user may enter the uniform resource locator (URL) of a website of interest. The browser 403 may also accept key words in a search box 406, and upon the selection of search button 408, provide a webpage with search results responsive to the search request to the user. Further, the information presented on the browser 403 may be viewed by using scroll bar 412 by selecting control 410 with the annunciator 426 and moving the control 410 along the scroll bar 412.

In one embodiment, the MPP 304 includes a view window 414 in which the media program is played back to the user, and a plurality of controls 416A-416F (hereinafter alternatively referred to as control(s) 416) which allow the playback of the media program to be controlled by the user. The controls 416 include a stop control 416C that is used to stop the playback of the media program, a play control 416F that is used to begin or resume playback of the media program and a pause control 416B that is used to pause playback of the media program. The controls 416 also include a fast forward control 416E that allow the user to fast forward through the media program, and a forward skip control 416D that allows the user to skip to the next scene or to the next media program. In one embodiment, next scene skipping can be selected by momentarily selecting the skip control 416D, while skipping to the next media program can be performed by selecting and holding the skip control 416D. Different scenes can be identified in the media program by use of markers indicating which frames begin a new scene or by the use of media program metadata identifying the frames for the first frame in each scene. Skip control 416A also allows skipping to the previous media program or scene, in the same way as skip control 416D.

In one embodiment, the MPP 304 may include a progress bar 422 that is rendered proximate the rendered media program in the view window 414. If the media program is progressively downloaded to the MPP 304, the progress bar 422 also may include a media buffer progress indicator 420 to indicate how much of the media program has been transmitted to the user computer 102 and buffered, and hence, how much of the media program might be available for seek previewing. Since streaming video permits the user to obtain access to different portions of the media program without buffering (e.g. through use of control signals transmitted to the media server 110 the media buffer progress indicator 420 is not required.

The control 418 indicates the temporal location of the frames currently being depicted by the MPP 304. The user may command the MPP 304 to replay any portion of the media program via control 418 manipulation by selecting the control 418 and moving the control 418 to a different location along the progress bar 422. Leftmost locations on the progress bar 422 indicate temporal locations near the beginning of the media program, while rightmost locations indicate temporal locations near the end of the media program.

Figure 5A:
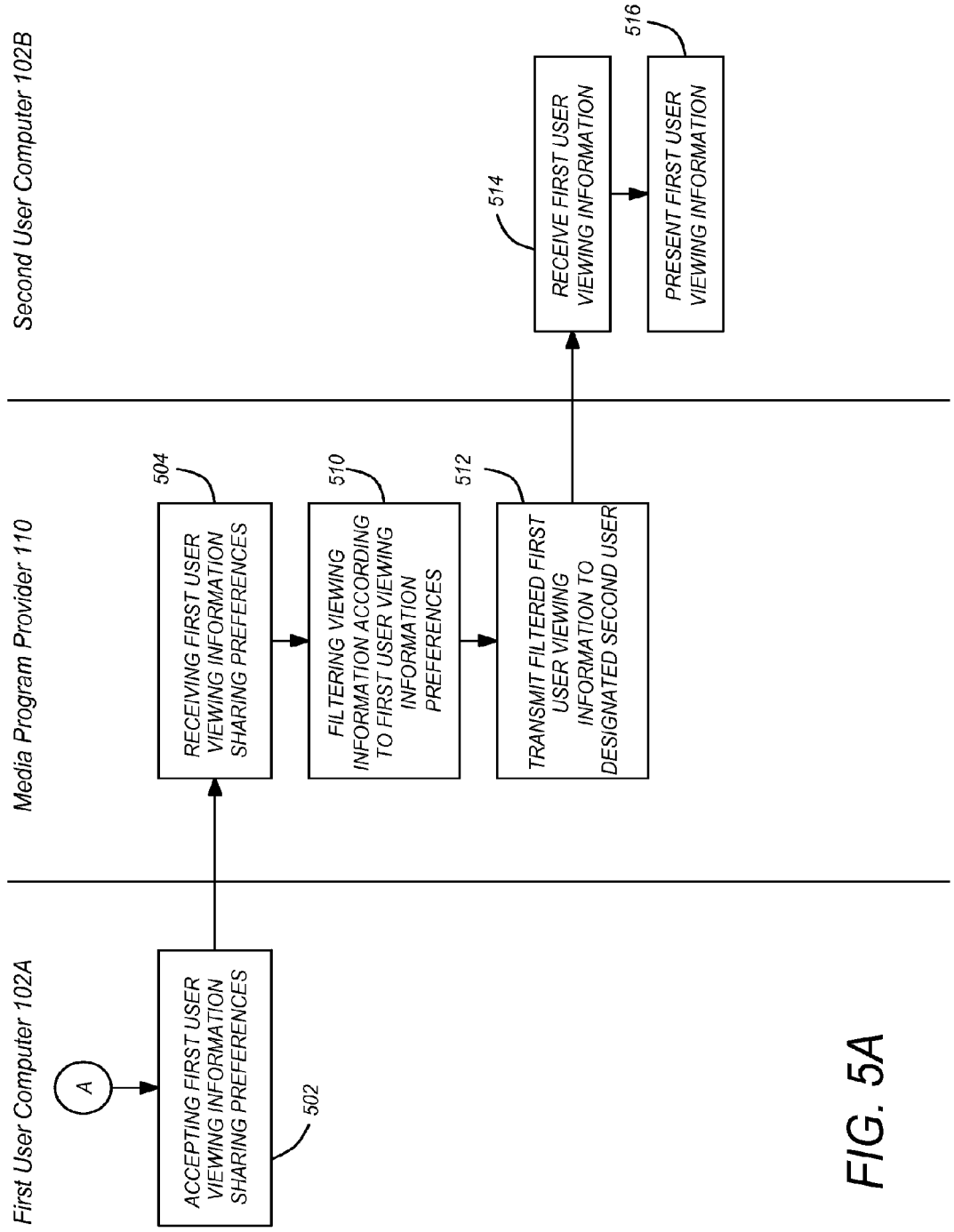
FIGS. 5A-5B are diagrams presenting exemplary method steps that can be used to practice the present invention.
Figure 5B:
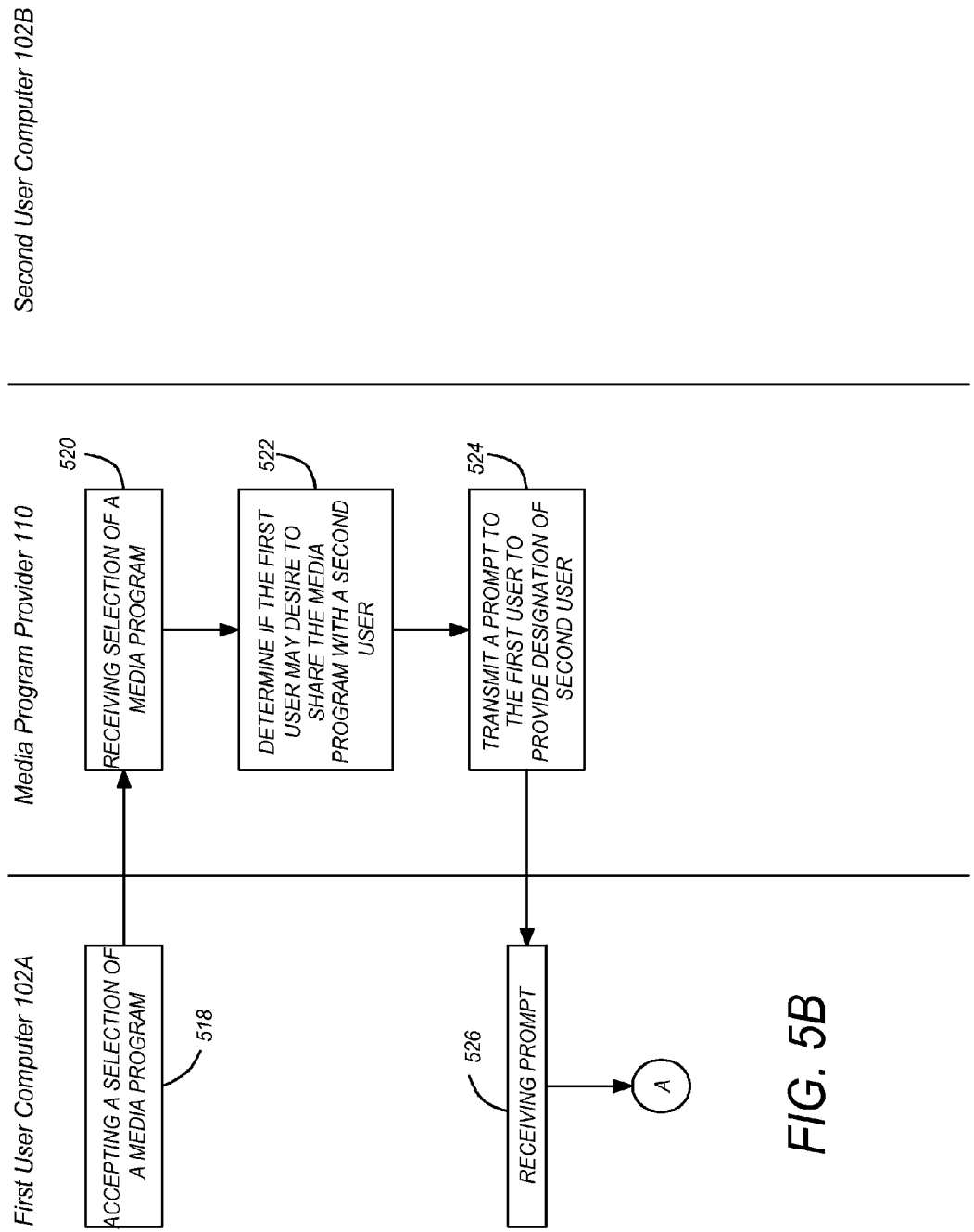

FIGS. 5A-5B are diagrams presenting exemplary method steps that can be used to practice the present invention. In block 502, the first user computer 102A accepts first user viewing information sharing preferences from the first user. Such viewing preferences can indicate, for example, which other users the first user wishes to share viewing information with and which class of media programs should be included in the shared viewing information. Media programs may be separated by classes defined by rating (e.g. PG, TV-14, Restricted, Adult), by subject matter (e.g. documentary, drama, sports) by topic (e.g. World War II, bicycle racing), by actor (e.g. Jimmy Stewart or Harrison Ford), length (e.g. media programs under one hour), by broadcast time (e.g. media programs broadcast after 10 PM), or any other measure. Further, the users 132 may suggest or define classes and indicate membership of a media program in a defined class. For example the user 132 may define a category of media programs relating to bicycling and a category of media programs relating to surfing, and share only those media programs with other users that the first user 132A knows to be interested in bicycling and surfing, respectively. The user may also desire to share viewing information with a large number of other users, but not wishes to exclude any viewing information related to any media programs having greater than a PG rating. In block 504, the media program provider 110 receives the first user viewing information sharing preferences and stores them for later use.

The received first user viewing information sharing preferences may include a designation of a second user 132B that the first user 132A wishes to share viewing information with, subject to the viewing information sharing preferences. In block 510, the viewing information of the first user 132A is filtered according to the first user 132A viewing information preferences, as shown in block 510. In block 512, the first user viewing information is transmitted to the designated second user. The first user viewing information is received in the second user computer 102B and presented to the second user 132B, as shown in blocks 514 and 516. The foregoing interaction between the user computers 132 and the media program provider 110 may occur via the viewing information sharing dialog shown in FIG. 3 using the user interface module 302 and one or more information sharing modules 324, which may be implemented by one or more hardware and/or software modules in the media program provider 110.

Figure 6:
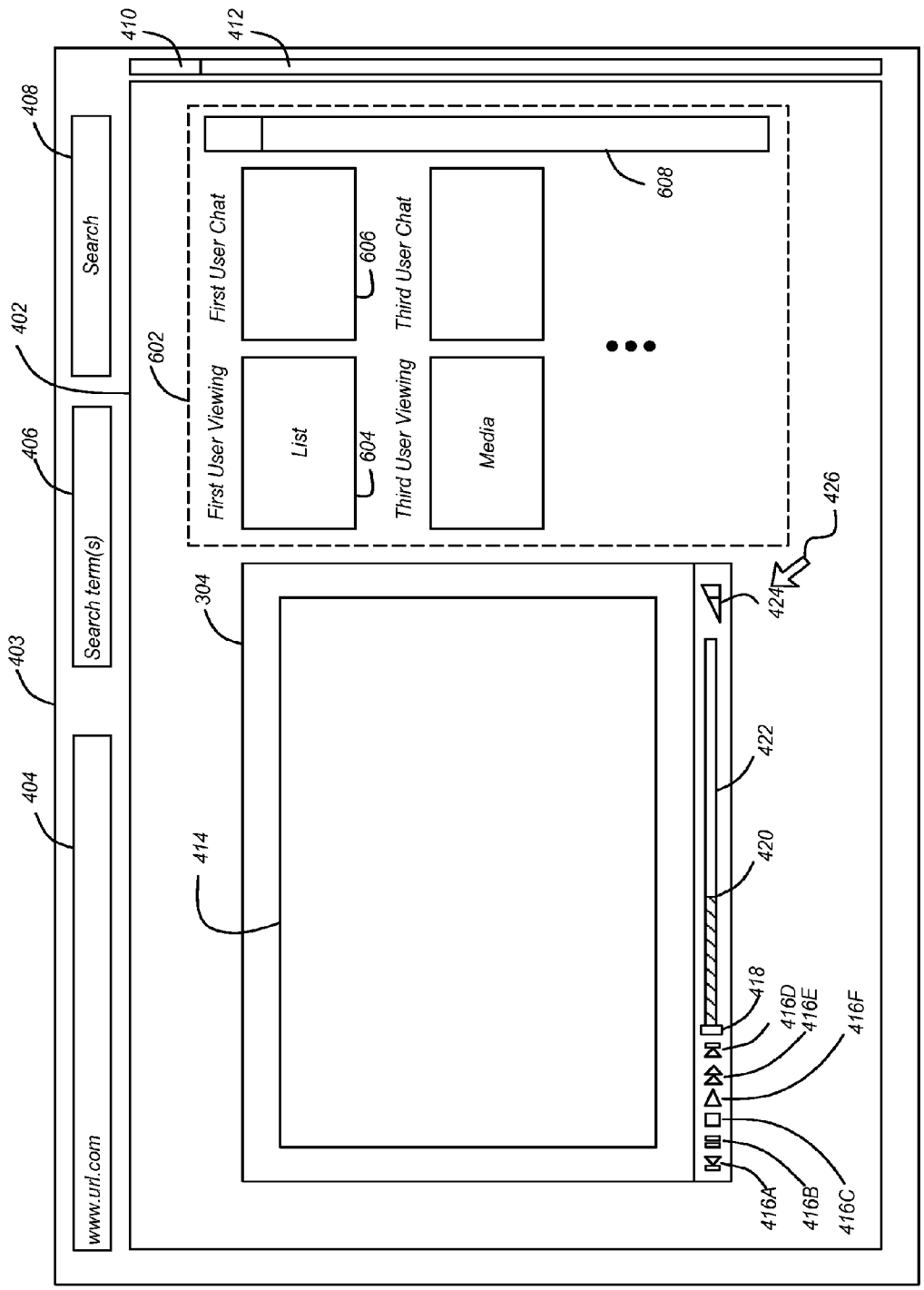
FIG. 6 is a drawing depicting one embodiment an interface showing of how first user viewing information may be presented to the second user

FIG. 6 is a drawing depicting one embodiment an interface showing of how first user viewing information may be presented to the second user. As described above with respect to FIG. 6, the interface includes the media program player 304, which may or may not be presenting a media program to the second user 132B. The interface also includes a viewing information sharing portion 602 in which the first user viewing information and viewing information of other users may be presented. In the illustrated embodiment, the first user viewing information is presented in a viewing preferences box 604. First user viewing information may simply be an alphanumeric identifier of the media program being currently presented to the first user 132A (for example, the name of that media program) a thumbnail of a frame of that media program or the box 604 may present the media program itself with moving images that may or may not be synchronized with the media program being presented to the first user 132A. In one embodiment, if the second user uses cursor 426 to select the box 604 of text presented therein, the associated media program is presented in the media program player 414.

In another embodiment, the viewing information comprises information identifying one or more media programs scheduled to be viewed by the first user 132A, and the time those media program(s) will be viewed.

The sharing portion 602 may also include a chat box 606. The chat box 606 can be used to chat with the first user 132A about any topic, including the viewing preferences of the first user. Using this feature, the second user 132B can watch their selected program on the media program player 304, watch the media program being played to the first user in the viewing information box 604, and chat with the first user 132A.

The sharing portion 602 may include the same information for a third, fourth, or fifth user, which may be navigable using scroll bar 608.

Other embodiments are also possible. For example, the first user viewing information as well as the viewing information of other users may be presented in the same list, categorized appropriately so that the second user can easily note that several users are watching the same media program.

In another embodiment, when the second user 132B begins watching a media program and the content delivery system recognizes that other users that have been designated so as to share viewing information with the second user, a message may be displayed to the second user indicating those other users are viewing the same program. The second user can then choose to synchronize the playback of the media program with one or more of those users to enhance the viewing experience and potentially chat about the media program.

In another embodiment, although the first user 132A has elected to share viewing information with the second user 132B by designating as such, the second user 132B may elect not to receive the first user viewing information. This can be implemented by presenting an interface informing the second user 132B that the first user 132A has designated the second user 132B as one whom with viewing information may be shared, and asking the second user 132B whether the second user 132B is willing to accept the first user viewing information. The same interface may then ask the second user 132B whether second user information may be shared with the first user 132A.

As described above, the foregoing features can be used to share the viewing of a media program with two or more users 132, and allow those users 132 to chat at the same time. This feature is useful when the users are remote from one another (e.g. separated by a substantial distance), but is also useful when the users are proximate or local to one another, perhaps, even in the same household. For example, the first user may wish to watch a media program on a large screen television in one room of an abode, while a second user may wish to watch the same media program on a computer screen while browsing the Internet. This can be implemented by simply either the first user 132A or the second user 132B identifying the other user as one with whom they would like to share viewing information, beginning play of the media program using the first device (e.g. user computer 102A), then having the other of the users select the viewing information box presented on their device (e.g. user computer 102B) to begin play of the same media program on that device. Such playback of the media program can be synchronized with the playback of the media program to the first user 132A or not.

Alternatively, when the media program provider 110 receives a request to play a media program, the content delivery system 300 may determine that another user known or related to the requesting user may be interested in watching the same media program. The media program provider 110 may recognize that the first user 132A may desire to share the media program with a second user 132B, and prompt the first user 132A to indicate whether the first user is so inclined. If the first user 132A indicates they want to share the media program with the second user 132B, they indicate as such by designating the second user 132A as such.

FIG. 5B is a diagram illustrating exemplary steps that can be used to prompt one user to share a media program with a second user. In block 518, the first user computer 102A accepts a selection of a media program from the first user 132A. The selection may be for immediate or later playback of the media program. In block 520, the media program provider 110 receives the selection of the media program from the first user computer 102A. The media program provider 110 then determines if the first user 132A may desire to share the playback of the media program with a second user 132B, as shown in block 522. If it is determined that the first user 132A may desire as such, a prompt is transmitted from the media program provider 110 to the first user computer 102A to provide the designation of the second user 132B indicating that the first user 132A wishes to share playback of the media program with the second user 132B, as shown in block 524. The first user computer 102A receives the prompt, and processing is passed to block 502 where the first user 132A may provide input describing viewing information sharing preferences, in this case, that the first user wants to share the viewing information (in this case, the playback of the media program itself) with the second user.

The media program provider 110 may determine that the first user 132A may share common attributes with and be interested in sharing the media program with another user in a number of different ways. For example, before media programs are delivered to user computers 102, the media program provider may require or request that the users 132 associated with those computers 102 provide registration information. Such registration information may include, for example, the street address, ZIP code, or telephone number of the user 132. Such information can be used to adduce whether the user is likely a member of the same household or living within the same structure as other users. Other information about the user may be used to determine that users may share common attributes. For example, one user's registration information may have indicated an interest in a particular sporting activity, entertainment activity or other topic. Based on geographical information and such user preferences, the media program provider 110 may identify users who would be interested in sharing the viewing of a media program or other viewer information. Other information, such as the internet protocol (IP) address of users can be used to determine that two or more users may be of the same household or otherwise interested in sharing viewer information.

One advantage of the foregoing is that if two users in the same household or sharing the same IP address are both interested in sharing the viewing of a media program, one version of the media program can be transmitted to both users at the same time, a process which would require less transmission bandwidth than the transmission of the same media program to two users separately.

In another aspect of the present invention, the selected media program is transmitted to the first user 132A and the second user 132B at the same time, but the advertisements presented to the first user 132A and the second user 132B are selected by the advertisement select service 316 according to parameters unique to each user 132, such as the user's preferences or viewing history. This permits advertisements to be selected individually for each user 132, while viewing the same media program.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
 receiving, by a computing device, registration information from a first user and a second user, wherein the registration information includes user preference information indicating preferences of the first user and the second user;
 receiving, by the computing device, a request from the first user to play a first video;
 determining, by the computing device, user information related to the first user and the second user, the user information including geographical information for the first user and the second user and the user preference information for the first user and the second user;
 analyzing, by the computing device, the geographical information and the user preference information to determine that the second user may be interested in viewing the first video based on the geographical information and the user preference information;
 suggesting, by the computing device, the second user to the first user as a possible viewer to share the first video in a viewing information box on an interface for the second user while the second user is playing a second video in a media player on the interface;
 determining, by the computing device, if the first user wants to share the first video with the second user;
 when the first user wants to share the first video with the second user, causing, by the computing device, display of viewing information for the first video in the viewing information box while the second user is playing the second video in the media player;
 receiving, by the computing device, a selection for the first video from the second user; and
 sending, by the computing device, the first video to the second user for display in the media player to replace the playing of the second video, wherein a single version of the first video is sent to the first user and the second user when the geographical information indicates the first user and the second user are in a same household.

2. The method of claim 1, wherein analyzing the geographical information and the user preference information to determine that the second user may be interested in viewing the first video comprises:
 determining, by the computing device, the second user is in a same geographic location as the first user.

3. The method of claim 2, wherein the second user is determined to be in the same physical household as the first user based on address information determined for the first user and the second user.

4. The method of claim 3, wherein the second user is determined to be in the same physical household as the first user based on an Internet Protocol (IP) address of the first user and an IP address of the second user.

5. The method of claim 1, wherein analyzing the geographical information and the user preference information to determine that the second user may be interested in viewing the first video comprises:
 determining, by the computing device, the second user has a common attribute as the first user.

6. The method of claim 1, wherein
 different advertisements are sent to the first user and the second user during the viewing of the single version of the first video by the first user and the second user.

7. The method of claim 1, further comprising:
 receiving, from the first user, a designation of a class of video that describes a characteristic of video for determining which videos should be restricted from sharing with the second user;
 determining, by the computing device, if the first video is in the class of video;

when the first video is not a member of the class, determining, by the computing device, the first user wants to share the first video with the second user; and when the first video is a member of the class, determining, by the computing device, the first user does not want to share the first video with the second user.

8. The method of claim 1, wherein analyzing the geographical information and the user preference information to determine that the second user may be interested in viewing the first video comprises:

determining, by the computing device, user sharing preferences for the first user; and determining, by the computing device, if the first user designated the second user for sharing videos in the user sharing preferences.

9. The method of claim 1, wherein determining if the first user wants to share the first video with the second user comprises:

sending, by the computing device, a prompt to the first user asking the first user if the first user wants to share the first video with the second user; and receiving, by the computing device, a response from the first user indicating the first user wants to share the first video with the second user.

10. The method of claim 1, wherein prior to sending the first video to the second user, the method further comprising:

receiving, by the computing device, confirmation from the second user that the second user wants to view the first video.

11. A non-transitory computer-readable storage medium containing instructions, that when executed, control a computer system to be configured for:

receiving registration information from a first user and a second user, wherein the registration information includes user preference information indicating preferences of the first user and the second user;

receiving a request from the first user to play a first video;

determining user information related to the first user and the second user, the user information including geographical information for the first user and the second user and the user preference information for the first user and the second user;

analyzing the geographical information and the user preference information to determine that the second user may be interested in viewing the first video based on the geographical information and the user preference information;

suggesting the second user to the first user as a possible viewer to share the first video in a viewing information box on an interface for the second user while the second user is playing a second video in a media player on the interface;

determining if the first user wants to share the first video with the second user;

when the first user wants to share the first video with the second user, causing display of viewing information for the first video in the viewing information box while the second user is playing the second video in the media player;

receiving a selection for the first video from the second user; and sending the first video to the second user for display in the media player to replace the playing of the second video, wherein a single version of the first video is sent to the first user and the second user when the geographical information indicates the first user and the second user are in a same household.

12. The non-transitory computer-readable storage medium of claim 11, wherein analyzing the geographical information and the user preference information to determine that the second user may be interested in viewing the first video comprises:

determining the second user is in a same geographic location as the first user.

13. The non-transitory computer-readable storage medium of claim 12, wherein the second user is determined to be in a same physical household as the first user based on address information determined for the first user and the second user.

14. The non-transitory computer-readable storage medium of claim 13, wherein the second user is determined to be in the same physical household as the first user based on an Internet Protocol (IP) address of the first user and an IP address of the second user.

15. The non-transitory computer-readable storage medium of claim 11, wherein prior to sending the first video to the second user, the method further comprising:

receiving confirmation from the second user that the second user wants to view the first video.

16. The non-transitory computer-readable storage medium of claim 11, wherein different advertisements are sent to the first user and the second user during the viewing of the single version of the first video by the first user and the second user.

17. The non-transitory computer-readable storage medium of claim 11, further configured for:

receiving, from the first user, a designation of a class of video that describes a characteristic of video for determining which videos should be restricted from sharing with the second user;

determining if the first video is in the class of video;

when the first video is not a member of the class, determining the first user wants to share the first video with the second user; and when the first video is a member of the class, determining the first user does not want to share the first video with the second user.

18. An apparatus comprising:

one or more computer processors; and a non-transitory computer-readable storage medium comprising instructions, that when executed, control the one or more computer processors to be configured for:

receiving registration information from a first user and a second user, wherein the registration information includes user preference information indicating preferences of the first user and the second user;

receiving a request from the first user to play a first video;

determining user information related to the first user and the second user, the user information including geographical information for the first user and the second user and the user preference information for the first user and the second user;

analyzing the geographical information and the user preference information to determine that the second user may be interested in viewing the first video based on the geographical information and the user preference information;

suggesting the second user to the first user as a possible viewer to share the first video in a viewing information box on an interface for the second user while the second user is playing a second video in a media player on the interface;

determining if the first user wants to share the first video with the second user;

when the first user wants to share the first video with the second user, causing display of viewing information for the first video in the viewing information box while the second user is playing the second video in the media player;

receiving a selection for the first video from the second user; and sending the first video to the second user for display in the media player to replace the playing of the second video, wherein a single version of the first video is sent to the first user and the second user when the geographical information indicates the first user and the second user are in a same household.

19. The non-transitory computer-readable storage medium of claim 11, wherein analyzing the geographical information and the user preference information to determine that the second user may be interested in viewing the first video comprises:

determining user sharing preferences for the first user; and determining if the first user designated the second user for sharing videos in the user sharing preferences.

20. The non-transitory computer-readable storage medium of claim 11, wherein determining if the first user wants to share the first video with the second user comprises:

sending a prompt to the first user asking the first user if the first user wants to share the first video with the second user; and receiving a response from the first user indicating the first user wants to share the first video with the second user.

\* \* \* \* \*